(12) United States Patent
Anson

(10) Patent No.: US 11,511,240 B2
(45) Date of Patent: Nov. 29, 2022

(54) BEVERAGE AERATION APPARATUS

(71) Applicant: Jonathan Ross Anson, Simi Valley, CA (US)

(72) Inventor: Jonathan Ross Anson, Simi Valley, CA (US)

( * ) Notice: Subject to any disclaimer, the term of this patent is extended or adjusted under 35 U.S.C. 154(b) by 315 days.

(21) Appl. No.: 16/884,025

(22) Filed: May 26, 2020

(65) Prior Publication Data

US 2020/0368697 A1  Nov. 26, 2020

Related U.S. Application Data

(60) Provisional application No. 62/852,812, filed on May 24, 2019.

(51) Int. Cl.

| | | |
|---|---|---|
| *B01F 23/23* | (2022.01) | |
| *A23L 2/54* | (2006.01) | |
| *B01F 23/231* | (2022.01) | |
| *A47G 19/22* | (2006.01) | |
| *B01F 33/501* | (2022.01) | |
| *B01F 23/236* | (2022.01) | |
| *B01F 23/2361* | (2022.01) | |
| *B01F 101/17* | (2022.01) | |

(52) U.S. Cl.
CPC ............ *B01F 23/2311* (2022.01); *A23L 2/54* (2013.01); *A47G 19/2227* (2013.01); *B01F 23/231* (2022.01); *B01F 23/236* (2022.01); *B01F 23/2361* (2022.01); *B01F 23/231151* (2022.01); *B01F 33/50111* (2022.01); *A47G 2019/2238* (2013.01); *B01F 23/231141* (2022.01); *B01F 2101/17* (2022.01)

(58) Field of Classification Search
CPC ............ B01F 23/231; B01F 23/231151; B01F 23/233; B01F 23/236; B01F 23/2361; A23L 2/54
See application file for complete search history.

(56) References Cited

U.S. PATENT DOCUMENTS

| | | | |
|---|---|---|---|
| 4,663,089 A | 5/1987 | Lowry et al. | |
| 8,101,222 B2 | 1/2012 | Burroughs et al. | |
| 9,067,703 B2 * | 6/2015 | Hewison | B65D 1/0223 |

(Continued)

FOREIGN PATENT DOCUMENTS

| | | | |
|---|---|---|---|
| CN | 204848881 U | * | 12/2015 |
| EP | 3308684 A4 | | 7/2018 |

(Continued)

*Primary Examiner* — Robert A Hopkins

(57) ABSTRACT

A beverage aeration apparatus is used to generate air bubbles within a contained beverage, preferably wine, to enhance the overall visual appeal of the wine. The apparatus is also configured to improve the overall scent of the wine by providing contact with air, which stimulates the release of various fragrant tones contained within the wine. A pump connected to a hose provides a constant flow of air into the bottom of a wine glass, thus allowing that air to flow up through the wine and gather smells and scents contained within. The bubbles may be controlled to flow at different rhythms or rates to provide an interesting visual pattern for the user to observe. Furthermore, the apparatus may be configured to provide spray nozzles or tools to cause the wine to eject at various angles and pressures, thus providing a dazzling wine show within the wine glass.

15 Claims, 8 Drawing Sheets

(56) References Cited

U.S. PATENT DOCUMENTS

2008/0290102 A1 11/2008 Mangano
2018/0304209 A1 10/2018 Hellmers et al.

FOREIGN PATENT DOCUMENTS

| RU | 2206130 C1 * | 6/2003 | ............. G09F 19/12 |
| WO | WO2013104100 A1 | 7/2013 | |
| WO | WO-2017066831 A1 * | 4/2017 | ............. A47G 23/00 |

* cited by examiner

BEVERAGE AERATION APPARATUS

The current application claims a priority to the U.S. Provisional Patent application Ser. No. 62/852,812 filed on May 24, 2019. The current application is filed on May 26, 2020 while May 24, 2020 was on a weekend and while May 25, 2020 was on a U.S. national holiday (Memorial Day).

FIELD OF THE INVENTION

The present invention relates generally to an apparatus for fluid aeration. More specifically, the present invention is a wine glass aerator designed to introduce continuous air bubbles from the bottom of a wine glass using an external air pump in order to provide pleasing a pleasant aesthetic and to enable smell testing without requiring the user to swirl the wine glass.

BACKGROUND OF THE INVENTION

Wine ranks highly among the oldest fermented beverages to be made available for human consumption. By allowing the natural sugars in grapes to ferment over time, the sugars feed bacteria which produce alcohol, giving different fruit-based wines their distinctive tastes. Over thousands of years, wine processing and development has evolved and become quite streamlined. Most of today's wines are factory-made and mass-produced, thus allowing access to a wider range of consumers. Over that time, methods for enhancing the wine drinking experience have been developed and discovered. Wine tastings are increasingly popular and allow users to enjoy different wines one sip at a time. Connoisseurs will recognize other properties of the wine as well, including the color, viscosity, interactions with light, and more. Such wine enthusiasts also often swirl the wine within the wine glass to release and enjoy fragrant undertones.

However, the untrained eye and nose may not appreciate or even be aware of such properties within their wine. Most occasional wine-drinkers will get enjoyment from sipping away at a glass over dinner, never realizing the full potential of the storied beverage they are consuming. The act of swirling wine within a glass may be seen as snooty, leaving people to swirl as an ironic or mocking gesture. Further, untrained eyes will divide wine into categories of red or white, never appreciating the effort required to create the visual characteristics of the wine. As such, wine in a glass seems to be a boring affair. What is needed is a tool which helps to release the various scents contained within a glass of wine. Further desirable is a device which attracts the eye of a casual wine consumer.

The present invention addresses these issues. More specifically, the present invention has a pump connected to a hose which provides a constant flow of air into the bottom of a wine glass, thus allowing that air to flow up through the wine and gather smells and scents contained within. The bubbles may be controlled to flow at different rhythms or rates to provide an interesting visual pattern for the user to observe. Furthermore, the present invention may be configured to provide spray nozzles or tools to cause the wine to eject at various angles and pressures, thus providing a dazzling wine show within the wine glass. The present invention may be equipped with lights and sensors to further provide visual stimulus to the user and to allow for synchronization of wine movement with music or sounds.

DETAILED DESCRIPTION OF THE INVENTION

All illustrations of the drawings are for the purpose of describing selected versions of the present invention and are not intended to limit the scope of the present invention.

Figure 1:
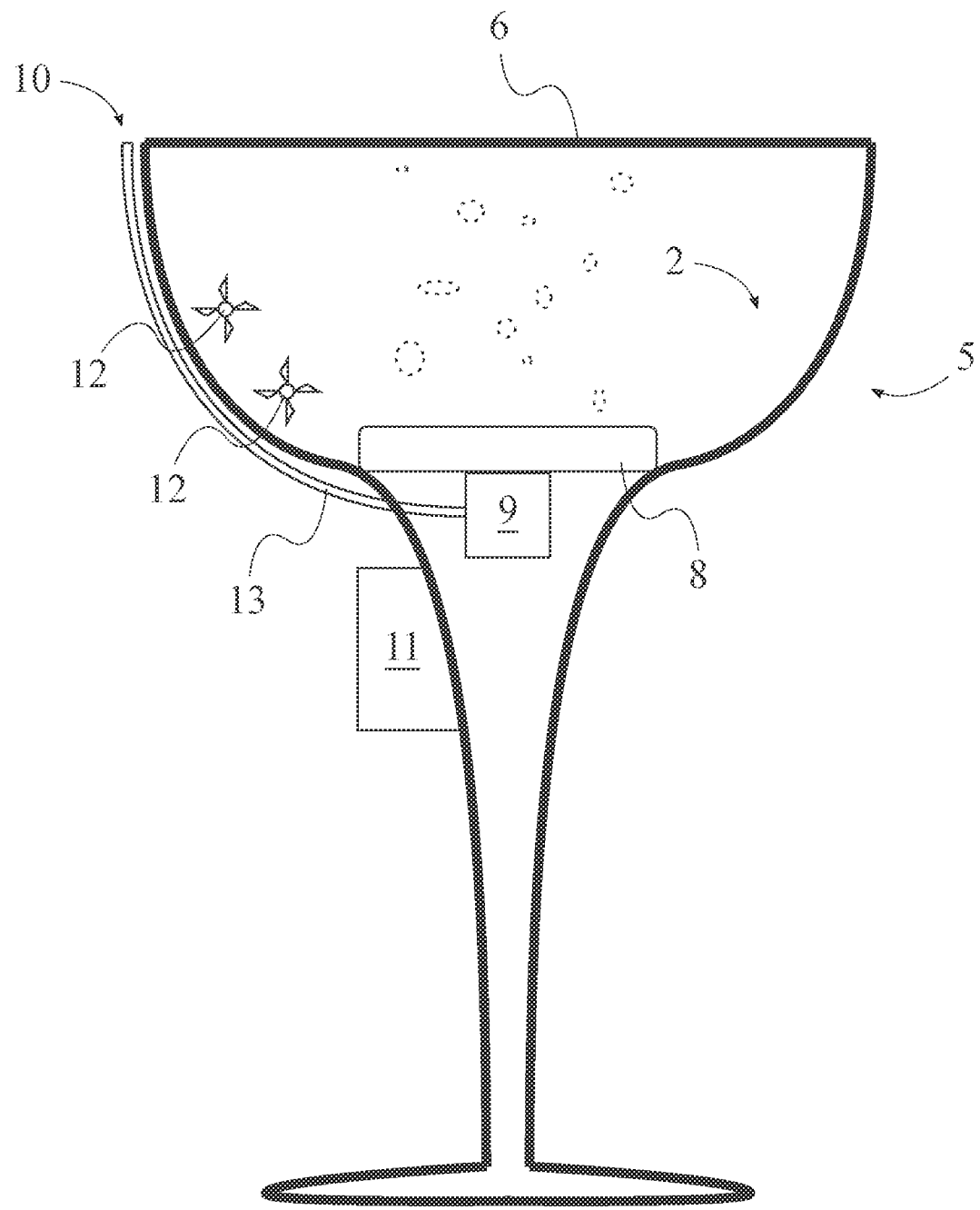
FIG. 1 is a schematic diagram representing a front view of the present invention.

The present invention is a beverage aeration apparatus that is used to generate air bubbles within a contained beverage, preferably wine, to enhance the overall visual appeal of the wine. The present invention is also configured to improve the overall scent of the wine by providing contact with air, which stimulates the release of various fragrant tones contained within the wine. The present invention comprises a beverage holder 1, a bubble generator 8, an air pump 9, an air intake 10, and a controller 11, as represented in FIG. 1. The beverage holder 1 relates to a receptacle, preferably a wine glass, capable of containing beverages, preferably wine, for subsequent human consumption. The bubble generator 8 relates to a mechanism which regulates the flow of air into the beverage holder 1. The bubble generator 8 may further allow for pattern control and modification of the flow rate in order to enable customizable control over the appearance of the beverage within the beverage holder 1. The air pump 9 relates to a fluid control mechanism that allows for air pressurization, thereby ensuring the transfer of air through the present invention. The air intake 10 relates to an opening through which air may enter the present invention for subsequent dispersal using the air pump 9 and the bubble generator 8. The controller 11 relates to an electronic device capable of collecting sensor inputs and other electronic signals, applying programmed logic, and relaying response electronic signals to the appropriate components.

Figure 3:
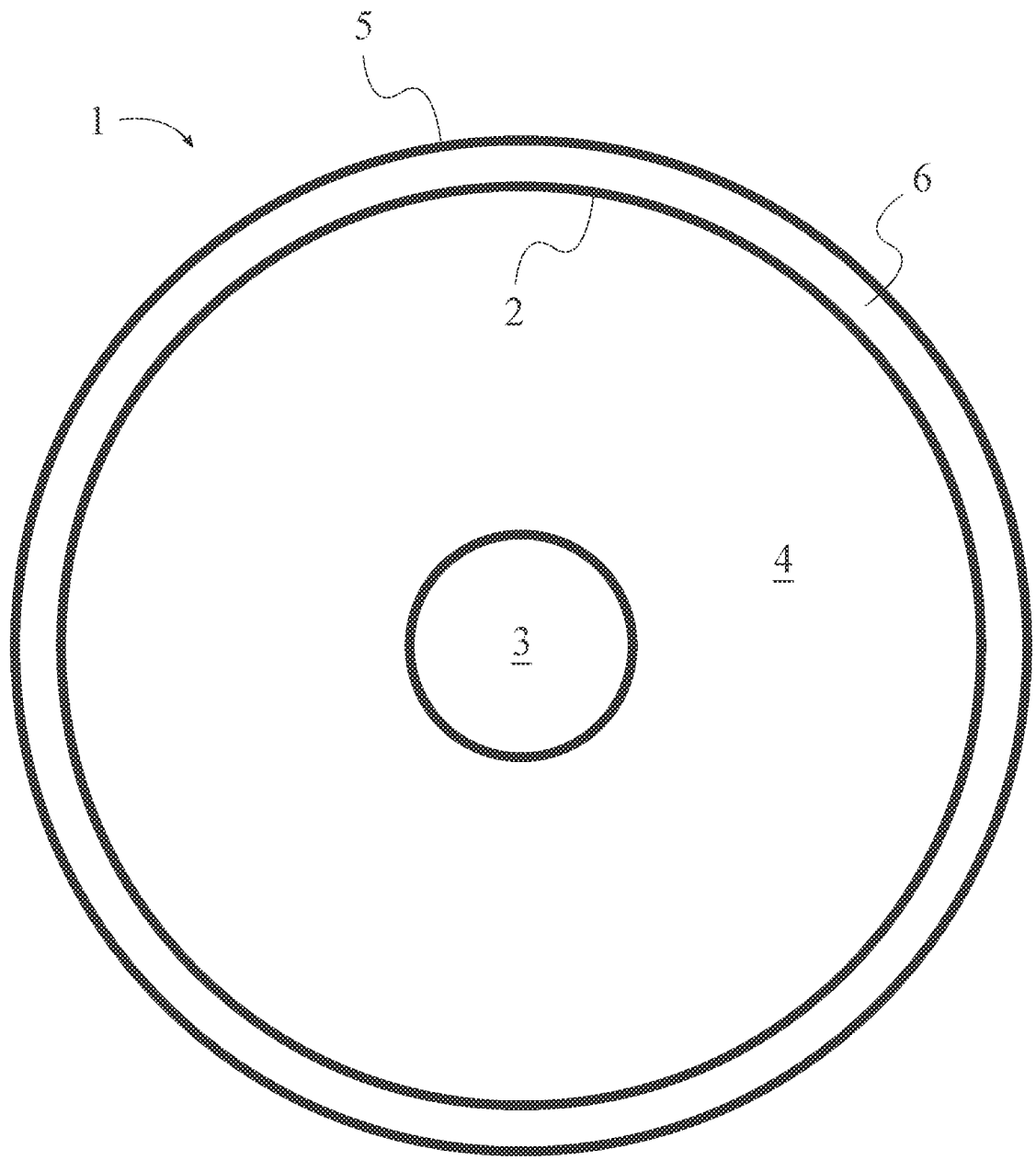
FIG. 3 is a schematic diagram representing a top view of the present invention.
Figure 6:
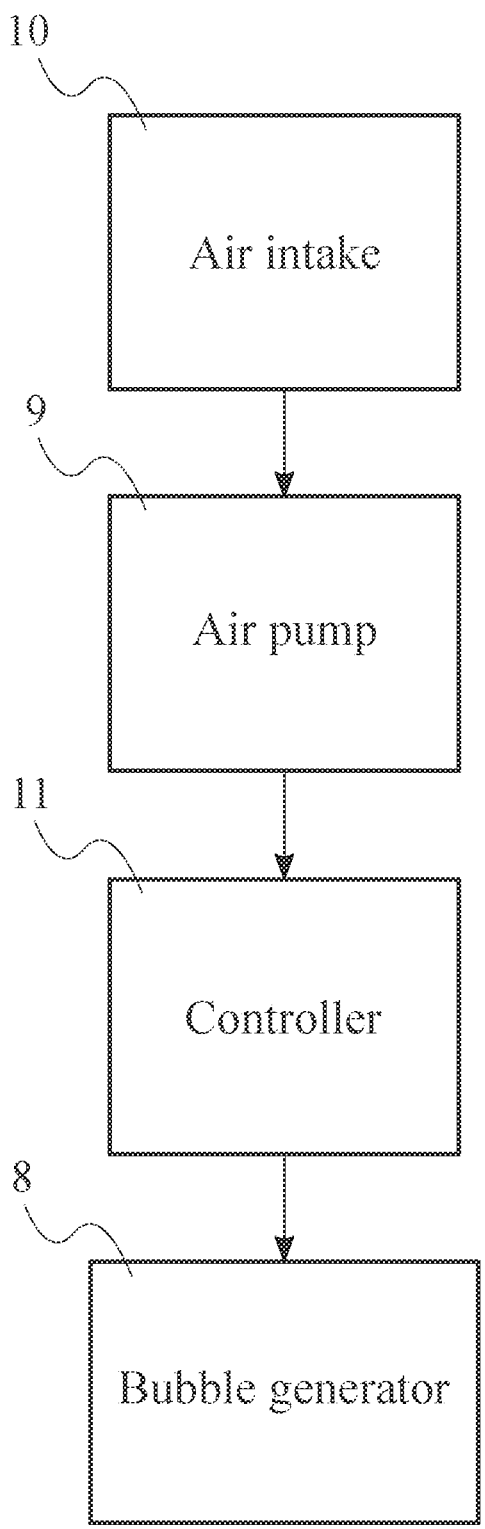
FIG. 6 is a process flow diagram representing the electronic connection of the controller to the air pump.

The general configuration of the aforementioned components allows the present invention to efficiently and effectively dispense air bubbles into wine or other beverages. The beverage holder 1 comprises an inner holder surface 2, an external holder surface 5, and an opening rim 6, as represented in FIG. 3. The inner holder surface 2 relates to a section of the beverage holder 1 which preferably contacts the beverage within the beverage holder 1. The external holder surface 5 refers to a section of the beverage holder 1 which, in the preferred usage of the present invention, contacts a user's hand or fingers. The opening rim 6 relates to an opening in the beverage holder 1 through which beverages may enter and exit the beverage holder 1. In order to enable optimal positioning of components, the inner holder surface 2 comprises an inner bottom portion 3 and an inner lateral portion 4. The inner bottom portion 3 is the section of the inner holder surface 2 which supports contained beverages against gravitational acceleration. The inner lateral portion 4 relates to the wall of the inner holder surface 2, which prevents contained beverages from spilling over the edges of the inner bottom portion 3. The bubble generator 8 is mounted adjacent to the inner bottom portion 3. In this way, bubbles generated from the bubble generator 8 float upwards through the inner holder surface 2. The controller 11 and the air pump 9 are mounted onto the external holder surface 5. Thus, the controller 11 and the air pump 9 avoid potential damage due to contact with the beverage within the present invention during use. The air intake 10 is in fluid communication with the air pump 9. Thus, air captured through the air intake 10 may be pressurized and controlled by the air pump 9. The air pump 9 is in fluid communication with the bubble generator 8. This arrangement allows the air from the air intake 10 to enter the bubble generator 8. The controller 11 is electronically connected to the bubble generator 8 and the air pump 9, as represented in FIG. 6. In this way, the controller 11 collects data from the air pump 9 and delivers corresponding signals to the bubble generator 8 based on flow rate, pressure, or other available metrics.

Figure 2:
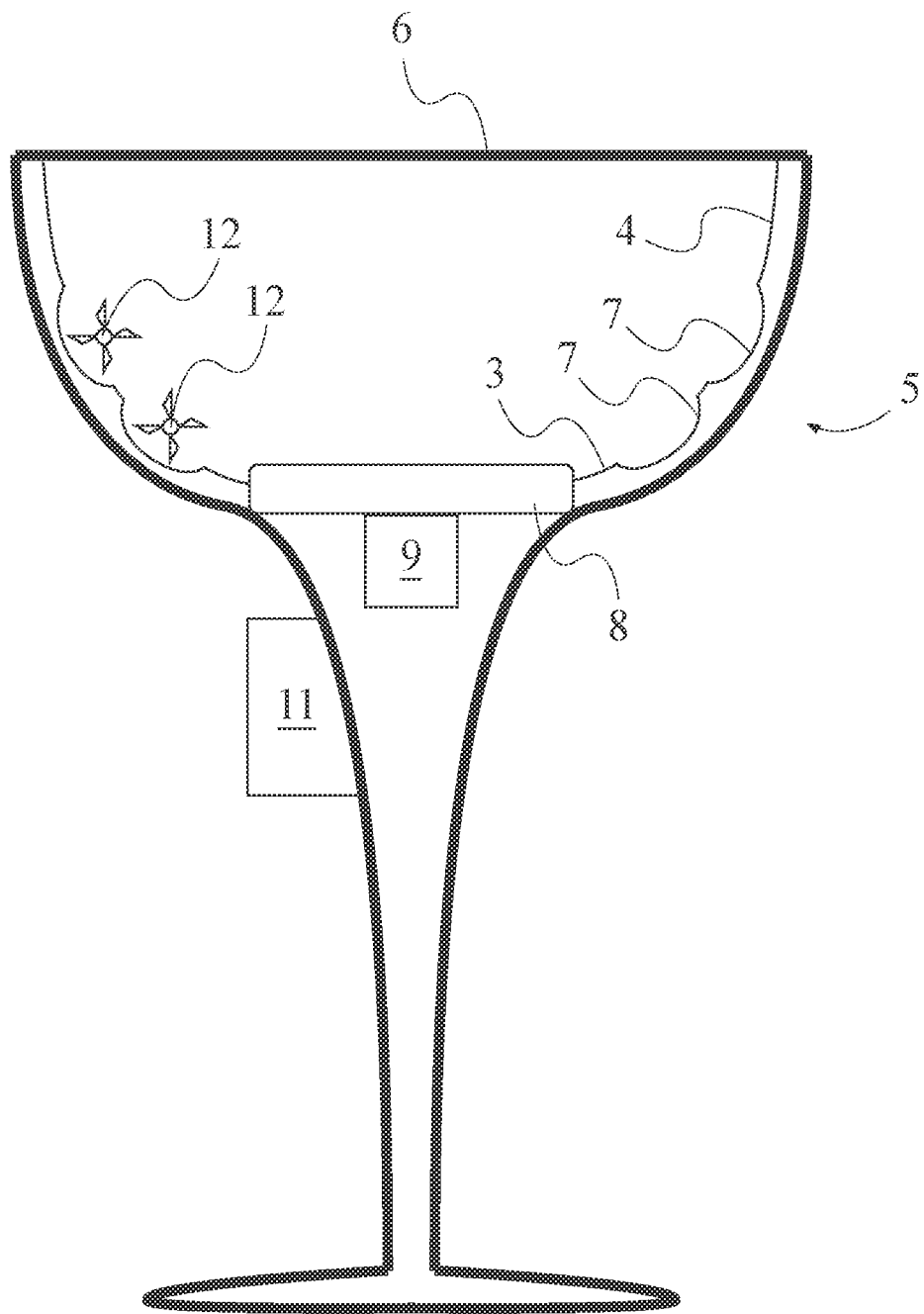
FIG. 2 is a schematic diagram representing a front view of the present invention.
Figure 7:
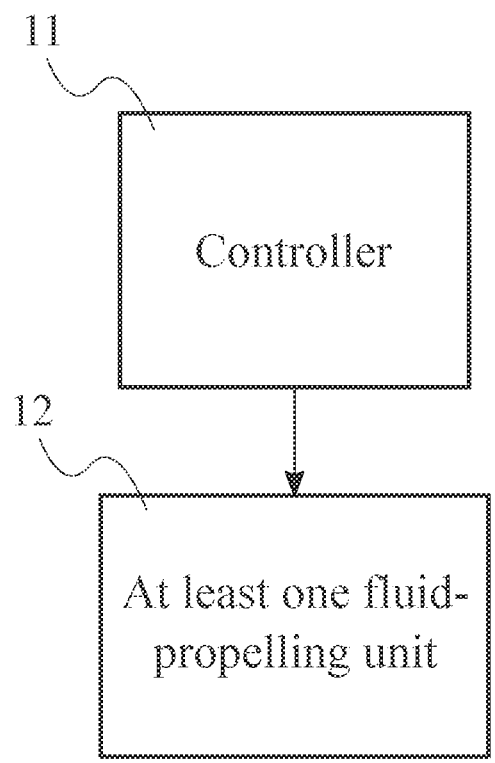
FIG. 7 is a process flow diagram representing the electronic connection of the controller to the at least one fluid-propelling unit.

The present invention may benefit from the ability to influence the positioning of bubbles and beverage molecules within the beverage holder 1. To enable this, the present invention may further comprise at least one fluid-propelling unit 12, as represented in FIG. 2. The at least one fluid-propelling unit 12 relates to a propeller or other similar fluid directing device capable of influencing the position of bubbles within the beverage holder 1. In an exemplary embodiment, the at least one fluid-propelling unit 12 provides a spiral effect that creates an interesting visual effect upon the bubbles. The at least one fluid-propelling unit 12 is mounted onto the inner lateral portion 4. This arrangement enables the at least one fluid-propelling unit 12 to affect the contents of the beverage holder 1. The controller 11 is electronically connected to the at least one fluid-propelling unit 12, as represented in FIG. 7. This arrangement allows the controller 11 to modify the rate of rotation of the at least one fluid-propelling unit 12, thus enabling control over the speed at which the fluid and bubbles move through the beverage holder 1.

It may be further desirable to allow for fluid to traverse the inner lateral portion 4. To achieve this desirable motion, the beverage holder 1 further comprises a plurality of circulation grooves 7, as represented in FIG. 2. The plurality of circulation grooves 7 relates to a set of channels cut into the inside of the beverage holder 1. In an exemplary embodiment, the plurality of circulation grooves 7 may be a plurality of concentric cuts; however, it is to be understood that the plurality of circulation grooves 7 may be a helical, double-helical, or other configuration, and the preferred embodiment is not meant to be limiting. The plurality of circulation grooves 7 is integrated across the inner lateral portion 4. This arrangement allows fluid passing through the plurality of circulation grooves 7 to circle around the inner perimeter of the beverage holder 1. The at least one fluid-propelling unit 12 is oriented towards the plurality of circulation grooves 7. In this way, fluid is guided towards and around the plurality of circulation grooves 7.

Figure 4:
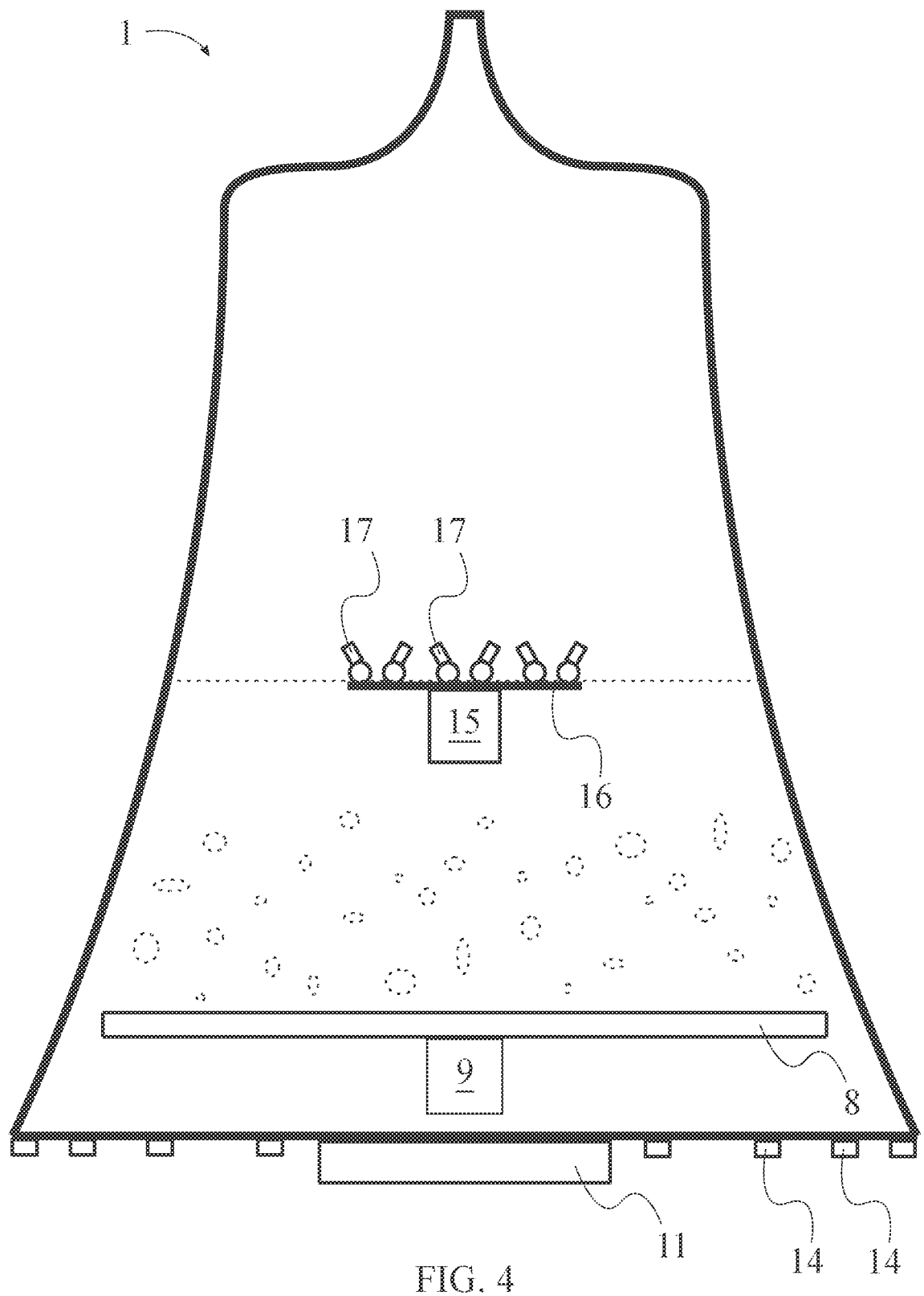
FIG. 4 is a schematic diagram representing a front view of a preferred embodiment of the present invention.

The air pump 9 must be positioned appropriately in order to optimize the positioning of components that are dependent upon the pressure of incident fluids and to prevent users from grasping or incidentally contacting the air pump 9. To this end, the air pump 9 may be positioned offset from the inner bottom portion 3, opposite the opening rim 6, as represented in FIG. 4. This arrangement prevents incidental contact of the air pump 9 with a user's hands or fingers. The air intake 10 is positioned adjacent to the air pump 9. In this way, air to be sent into the beverage holder 1 travels a minimal distance from the air intake 10 through the air pump 9 and into the beverage holder 1.

Figure 5:
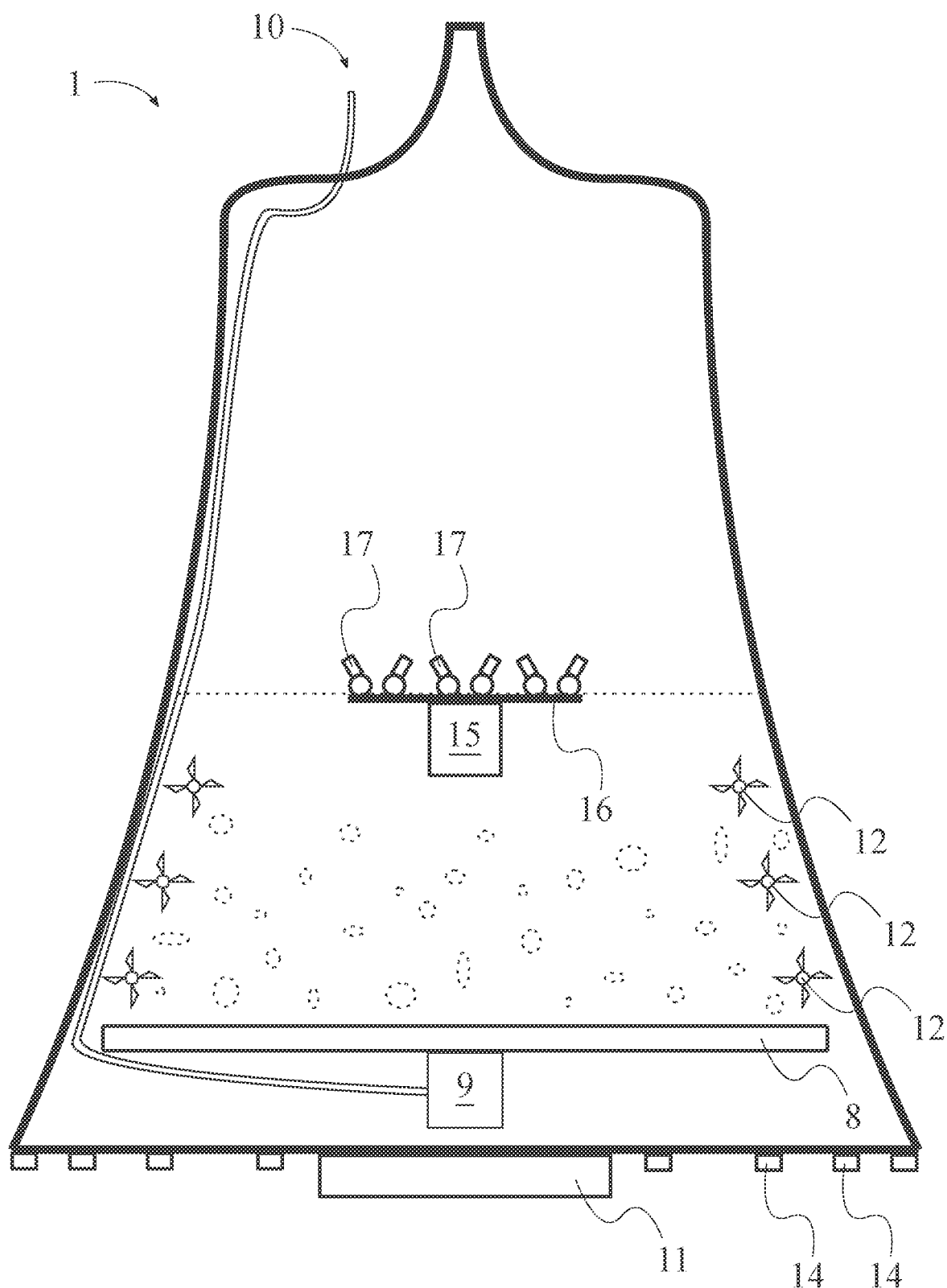
FIG. 5 is a schematic diagram representing a front view of a preferred embodiment of the present invention.

Alternatively, the present invention may benefit from collection of air that has already passed through the contained beverage. Such an arrangement allows for collection and reuse of air that has already captured some of the fragrant tones of the contained beverage. To provide for this, air pump 9 may be positioned adjacent to the inner bottom portion 3, opposite the opening rim 6. This positioning allows for convenient proximity of the air pump 9 to the beverage holder 1, thus reducing the electrical demand of the air pump 9. The air intake 10 is positioned adjacent to the opening rim 6, as represented in FIG. 5. In this way, the air entering the air intake 10 is likely to be air that has just risen from through the beverage within the beverage holder 1, thereby multiplying the intensity of the captured scent.

The present invention may require a mechanism for transporting or directing pressurized air from the air intake 10 to the bubble generator 8. To achieve this, the present invention may further comprise a tubing 13, as represented in FIG. 1. The tubing 13 relates to a preferably hollow, cylindrical, pressure resistant extrusion through which fluids may travel. The air pump 9 is in fluid communication with the bubble generator 8 by the tubing 13. This arrangement enables the user to direct the path of the air, as well as to ensure lamellar flow of air into the bubble generator 8. The tubing 13 traverses across the external holder surface 5, over the opening rim 6, and across the inner holder surface 2. Thus, the tubing 13 may be retrofit onto an existing glass and also avoids areas where the user may touch the beverage holder 1.

The present invention may further benefit from the inclusion of lights or additional features to draw the user's attention to the beverage. To this end, the present invention may further comprise a plurality of light emitting diodes (LEDs) 14, as represented in FIG. 4. The plurality of LEDs 14 relates to a set of lighting units capable of illuminating in a variety of different colors. The plurality of LEDs 14 is mounted onto the external holder surface 5. This arrangement ensures that the plurality of LEDs 14 may function regardless of the presence or absence of a beverage within the beverage holder 1. The plurality of LEDs 14 is distributed about the inner bottom portion 3. Thus, the plurality of LEDs 14 is positioned to adequately provide functional illumination as well as a variety of patterns for different aesthetic lighting techniques. The controller 11 is electronically connected to the inner bottom portion 3. This arrangement allows the plurality of LEDs 14 to light up according to appropriate electronic stimuli as determined by the controller 11 and simultaneously enables transmission of electronic power to the plurality of LEDs 14.

Figure 8:
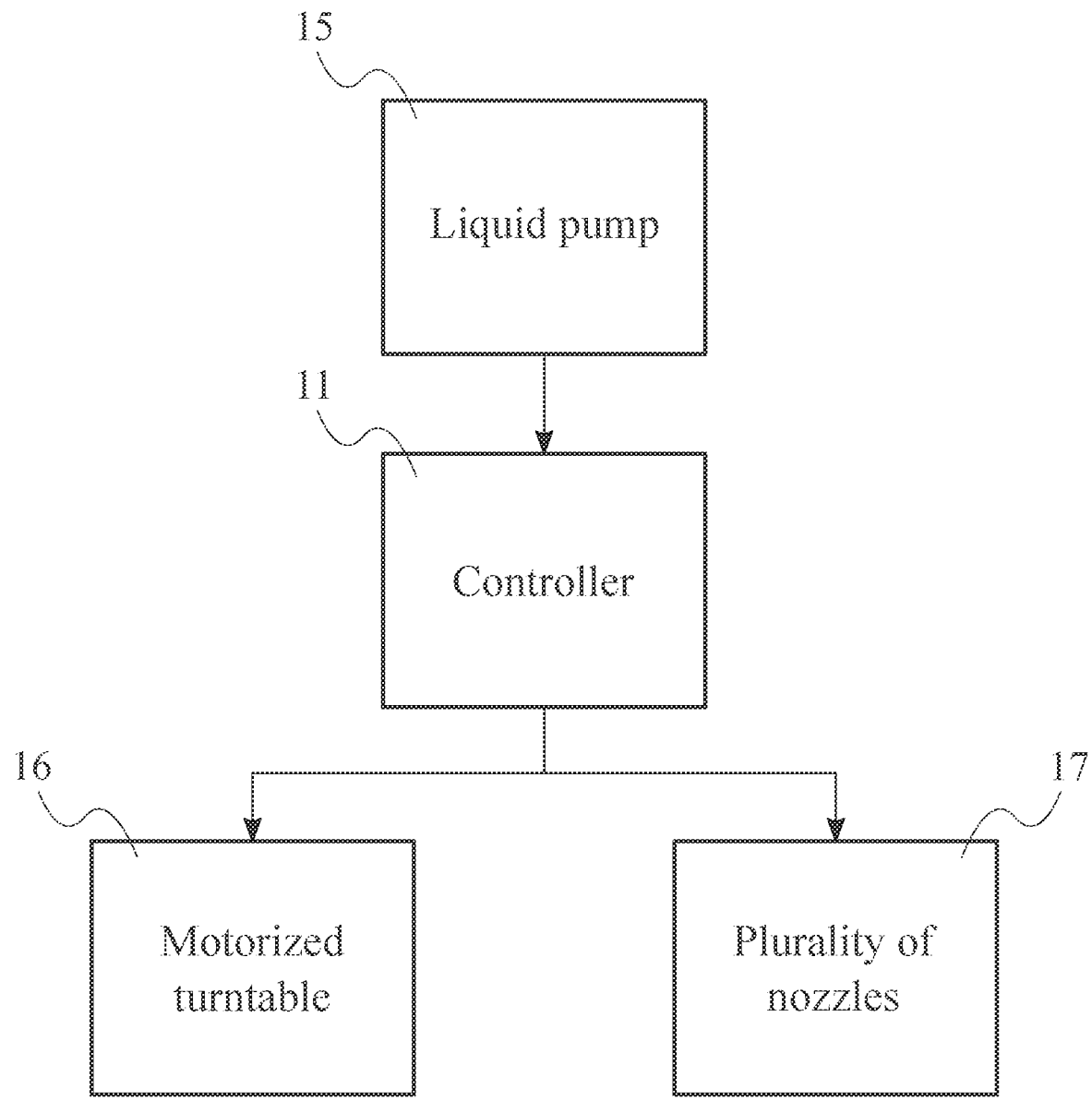
FIG. 8 is a process flow diagram representing the electronic connection of the controller to the liquid pump.

The present invention may further be adapted for use as a full lightshow within a glass. To achieve this effect, the present invention may comprise a liquid pump 15, a motorized turntable 16, and a plurality of nozzles 17, as represented in FIG. 4. The liquid pump 15 relates to a fluid pressurization device optimized for incompressible fluids, especially water or water-based liquids like wine. The motorized turntable 16 relates to a preferably disk-shaped unit used to mount the plurality of nozzles 17. The plurality of nozzles 17 relates to a series of openings that allow for the dispensation of liquids, often at low to moderate pressures. The motorized turntable 16 is rotatably mounted to the inner bottom portion 3. This arrangement allows the motorized turntable 16 to rotate relative to the beverage holder 1. The motorized turntable 16 being centrally positioned to the inner bottom portion 3. Thus, the motorized turntable 16 is concentrically oriented within the beverage holder 1. The liquid pump 15 is mounted adjacent to the inner bottom portion 3. In this way, fluid may travel a minimal distance from the liquid pump 15 to the plurality of nozzles 17. The plurality of nozzles 17 is pivotably mounted onto the motorized turntable 16, opposite the inner bottom portion 3. This arrangement enables the nozzles to rotate in place relative to the motorized turntable 16 and simultaneously revolve around the inner bottom portion 3, thus enabling interesting visual effects. The plurality of nozzles 17 is peripherally distributed about the motorized turntable 16. In this way, the plurality of nozzles 17 is arranged for optimal liquid dispensation throughout the beverage holder 1. The liquid pump 15 is in fluid communication with each of the plurality of nozzles 17. Thus, pressure generated from the liquid pump 15 enables liquid to exit the plurality of nozzles 17 in whatever orientation they may be. The liquid pump 15 may interface with a series of valves to modify or eliminate flowrate through each of the plurality of nozzles 17. The controller 11 is electronically connected to the liquid pump 15, the motorized turntable 16, and the plurality of nozzles 17, as represented in FIG. 8. Therefore, the movement of the plurality of nozzles 17 relative to the inner bottom portion 3 and to the motorized turntable 16 may be synchronized with the pressure applied on the liquid from the liquid pump 15.

In an exemplary embodiment, the present invention may further include a remote control. The remote control relates to any of a variety of control modules, including, but not limited to, mobile applications, desktop applications, handheld input collectors, display panels, and more. The remote control is electronically connected to the controller 11. The electronic connection may occur locally, as through Bluetooth or other short-range wireless connections, or over long distances requiring the employment of at least one remote server and other corresponding technologies. This arrangement ensures that signals sent from the remote control may be collected by the controller 11 for subsequent deployment of appropriate electronic responses. The controller 11 may further be provided with music or audio inputs, preferably through the remote control. Such an arrangement allows the controller 11 to send synchronizing signals to the liquid pump 15, the motorized turntable 16, and the plurality of nozzles 17 which allow for customizable routines to be performed. The present invention may further comprise a speaker. The speaker is an electronic device capable of converting electronic inputs into projected audio outputs. The speaker is electronically connected to the controller 11. This arrangement enables the user to appreciate the synchronization of the liquid pump 15, the motorized turntable 16, and the plurality of nozzles 17 with music.

Although the invention has been explained in relation to its preferred embodiment, it is to be understood that many other possible modifications and variations can be made without departing from the spirit and scope of the invention as hereinafter claimed.

What is claimed is:

1. A beverage aeration apparatus comprises:
    a beverage holder;
    a bubble generator;
    an air pump;
    an air intake;
    a controller;
    a plurality of light emitting diodes (LEDs);
    the beverage holder comprises an inner holder surface, an external holder surface, and an opening rim;
    the inner holder surface comprises an inner bottom portion and an inner lateral portion;
    the bubble generator being mounted adjacent to the inner bottom portion;
    the controller and the air pump being mounted onto the external holder surface;
    the air intake being in fluid communication with the air pump;
    the air pump being in fluid communication with the bubble generator;
    the controller being electronically connected to the bubble generator and the air pump;
    the plurality of LEDs being mounted onto the external holder surface;
    the plurality of LEDs being distributed about the inner bottom portion; and
    the controller being electronically connected to the inner bottom portion.

2. The beverage aeration apparatus as claimed in claim 1 comprises:
    at least one fluid-propelling unit;
    the at least one fluid-propelling unit being mounted onto the inner lateral portion; and
    the controller being electronically connected to the at least one fluid-propelling unit.

3. The beverage aeration apparatus as claimed in claim 2 comprises:
    the beverage holder further comprises a plurality of circulation grooves;
    the plurality of circulation grooves being integrated across the inner lateral portion; and
    the at least one fluid-propelling unit being oriented towards the plurality of circulation grooves.

4. The beverage aeration apparatus as claimed in claim 1 comprises:
    the air pump being positioned offset from the inner bottom portion, opposite the opening rim; and
    the air intake being positioned adjacent to the air pump.

5. The beverage aeration apparatus as claimed in claim 1 comprises:
    the air pump being positioned adjacent to the inner bottom portion, opposite the opening rim; and
    the air intake being positioned adjacent to the opening rim.

6. The beverage aeration apparatus as claimed in claim 1 comprises:
    a tubing;
    the air pump being in fluid communication with the bubble generator by the tubing; and
    the tubing traversing across the external holder surface, over the opening rim, and across the inner holder surface.

7. The beverage aeration apparatus as claimed in claim 1 comprises:
    at least one liquid pump;
    a motorized turntable;
    a plurality of nozzles;
    the motorized turntable being rotatably mounted to the inner bottom portion;
    the motorized turntable being centrally positioned to the inner bottom portion;
    the at least one liquid pump being mounted adjacent to the inner bottom portion;
    the plurality of nozzles being pivotably mounted onto the motorized turntable, opposite the inner bottom portion;
    the plurality of nozzles being peripherally distributed about the motorized turntable;

the at least one liquid pump being in fluid communication with each of the plurality of nozzles; and the controller being electronically connected to the at least one liquid pump, the motorized turntable, and the plurality of nozzles.

8. The beverage aeration apparatus as claimed in claim 7 comprises:

a series of valves; and the at least one liquid pump being in fluid communication with each of the plurality of nozzles through the series of valves.

9. A beverage aeration apparatus comprises:

a beverage holder;

a bubble generator;

an air pump;

an air intake;

a controller;

at least one fluid-propelling unit;

a plurality of light emitting diodes (LEDs);

the beverage holder comprises an inner holder surface, an external holder surface, and an opening rim;

the inner holder surface comprises an inner bottom portion and an inner lateral portion;

the bubble generator being mounted adjacent to the inner bottom portion;

the controller and the air pump being mounted onto the external holder surface;

the air intake being in fluid communication with the air pump;

the air pump being in fluid communication with the bubble generator;

the controller being electronically connected to the bubble generator and the air pump;

the at least one fluid-propelling unit being mounted onto the inner lateral portion;

the controller being electronically connected to the at least one fluid-propelling unit;

the plurality of LEDs being mounted onto the external holder surface;

the plurality of LEDs being distributed about the inner bottom portion; and the controller being electronically connected to the inner bottom portion.

10. The beverage aeration apparatus as claimed in claim 9 comprises:

the beverage holder further comprises a plurality of circulation grooves;

the plurality of circulation grooves being integrated across the inner lateral portion; and the at least one fluid-propelling unit being oriented towards the plurality of circulation grooves.

11. The beverage aeration apparatus as claimed in claim 9 comprises:

the air pump being positioned offset from the inner bottom portion, opposite the opening rim; and the air intake being positioned adjacent to the air pump.

12. The beverage aeration apparatus as claimed in claim 9 comprises:

the air pump being positioned adjacent to the inner bottom portion, opposite the opening rim; and the air intake being positioned adjacent to the opening rim.

13. The beverage aeration apparatus as claimed in claim 9 comprises:

a tubing;

the air pump being in fluid communication with the bubble generator by the tubing; and the tubing traversing across the external holder surface, over the opening rim, and across the inner holder surface.

14. The beverage aeration apparatus as claimed in claim 9 comprises:

at least one liquid pump;

a motorized turntable;

a plurality of nozzles;

the motorized turntable being rotatably mounted to the inner bottom portion;

the motorized turntable being centrally positioned to the inner bottom portion;

the at least one liquid pump being mounted adjacent to the inner bottom portion;

the plurality of nozzles being pivotably mounted onto the motorized turntable, opposite the inner bottom portion;

the plurality of nozzles being peripherally distributed about the motorized turntable;

the at least one liquid pump being in fluid communication with each of the plurality of nozzles; and the controller being electronically connected to the at least one liquid pump, the motorized turntable, and the plurality of nozzles.

15. The beverage aeration apparatus as claimed in claim 14 comprises:

a series of valves; and the at least one liquid pump being in fluid communication with each of the plurality of nozzles through the series of valves.

* * * * *